United States Patent [19]

Schloman

[11] Patent Number: 5,998,512
[45] Date of Patent: Dec. 7, 1999

[54] REDUCED-LIPID NATURAL RUBBER LATEX

[75] Inventor: William W. Schloman, Stow, Ohio

[73] Assignee: The University of Akron, Akron, Ohio

[21] Appl. No.: 09/119,338

[22] Filed: Jul. 20, 1998

[51] Int. Cl.$^6$ ........................................ C08K 3/00
[52] U.S. Cl. ................................. 524/17; 524/18
[58] Field of Search ......................... 524/17, 18

[56] References Cited

U.S. PATENT DOCUMENTS

| | | | |
|---|---|---|---|
| 2,475,141 | 7/1949 | Jones | 233/47 |
| 4,179,334 | 12/1979 | Esders et al. | 195/30 |
| 4,259,440 | 3/1981 | Gupta et al. | 435/15 |
| 4,435,337 | 3/1984 | Kay et al. | 528/493 |
| 4,526,959 | 7/1985 | Kay et al. | 528/930 |
| 5,449,607 | 9/1995 | Wilton | 435/7.1 |
| 5,563,241 | 10/1996 | Beezhold | 528/482 |
| 5,580,942 | 12/1996 | Cornish | 528/1 |
| 5,622,998 | 4/1997 | Tanaka et al. | 521/41 |

*Primary Examiner*—Edward J. Cain
*Attorney, Agent, or Firm*—Renner, Kenner, Greive, Bobak, Taylor & Weber

[57] ABSTRACT

A process for reducing the amount of lipids within natural rubber latices comprising the steps of obtaining a natural rubber latex from a guayule bush, the latex having a dry natural rubber content of from about 10 to about 40 percent by weight, adding from about 0.1 to about 25 parts by weight of a surfactant per one hundred parts by weight of dry natural rubber, wherein the surfactant is selected from the group including nonionic, ionic, and amphoteric surfactants, adding from about 1,000 units to about 500,000 units of a lipid reducing enzyme preparation per gram of dry natural rubber, wherein the lipid reducing enzyme preparation is selected from the group including lipases from plant, animal, synthetic and microbial sources, adding a pH buffer to maintain the pH in a range of from about 5 to about 12, mixing the natural rubber latex with the lipid reducing enzyme preparation for a period of between one-half hour to about 24 hours at a temperature of from about 20° C. to about 60° C., separating rubber particles into a concentrated rubber phase from the latex by techniques selected from the group including batchwise centrifugation, continuous centrifugation, and creaming, rinsing the concentrated rubber phase with water until the protein content is less than the protein content in the natural rubber latex.

19 Claims, 2 Drawing Sheets

REDUCED-LIPID NATURAL RUBBER LATEX

The U.S. Government has a paid-up license in this invention and the right in limited circumstances to require the patent owner to license others on reasonable terms as provided by the terms of U.S.D.A.-ARS Specific Cooperative Agreement 58- 53444-510 awarded by the U.S. Department of Agriculture.

TECHNICAL FIELD

The present invention is directed toward latices of natural rubber and vulcanized dipped films thereof. More specifically, the present invention is directed toward latices with reduced levels of non-rubber, extractable lipids. The present invention is also directed toward a process for preparing latices of natural rubber containing reduced lipid levels, as well as dipped formed goods thereof.

BACKGROUND OF THE INVENTION

Natural rubber latex is most useful in the production of dip-formed goods such as gloves, balloons, condoms, dental dams, and tubing. The vulcanized latex films utilized for these applications exhibit useful and desirable mechanical properties. The presence of certain non-rubber components in the latex, however, tends to inhibit these desired properties. Because these non-rubber components are relatively low molecular weight substances—that is, with molecular weights substantially below about 10,000—these components may act undesirably as a dilutent and plasticizer in dried vulcanized films prepared from latex. As a result, a vulcanized film prepared from a latex containing a relatively high content of these low molecular weight non-rubber components may suffer from less desirable mechanical properties as compared with a film prepared from a latex containing a relatively low content of these components.

The low molecular weight non-rubber component content of *Hevea brasiliensis* (also known as the Brazilian rubber tree) rubber latex is relatively low.

It is well known that Hevea brasiliensis is the preferred source of natural rubber latex, but recent concerns about allergic reactions by some individuals to rubber products made from *Hevea brasiliensis* rubber latex has motivated work toward other rubber sources. For example, natural rubber latex from the guayule bush and related plants have been used as a *Hevea brasiliensis* substitute. Guayule latex, however, typically contains a relatively high concentration of low molecular weight non-rubber components that deleteriously impact many of the properties of the latex and dipped formed goods thereof. Because these low molecular weight non-rubber components are non-extractable due to their water insolubility, techniques known heretofore in the art for purifying latex, especially guayule latex, have proven to be unsuccessful in removing the low molecular weight non-rubber components from the latex. Therefore, there is a need in the art for an improved method for purifying latices that contain relatively large concentrations of low molecular weight non-rubber components.

SUMMARY OF INVENTION

It is therefore, an object of the present invention to provide a technique for reducing the level of non-extractable resin, from natural rubber latices, especially where the latices contain high levels of non-extractable resins such as guayule latex.

It is therefore, another an object of the present invention to provide a natural rubber latex with reduced levels of non-extractable resins, as well as dipped formed goods thereof.

It is yet another object to provide a process for preparing a cured dipped film of a natural rubber latex wherein the film exhibits increased modulus and cure rate as a result of containing reduced levels of triglycerides.

At least one or more of the foregoing objects, together with the advantages thereof over the known art relating to natural rubber latices, which shall become apparent from the specification that follows, are accomplished by the invention as hereinafter described and claimed.

In general the present invention also includes a process for reducing the amount of lipids within natural rubber latices comprising the steps of obtaining a natural rubber latex, mixing the natural rubber latex with a lipid reducing enzyme preparation.

The present invention also includes a latex prepared by obtaining a natural rubber latex, mixing the natural rubber latex with a lipid reducing enzyme preparation.

The present invention further provides a process for reducing the amount of lipids within natural rubber latices comprising the steps of obtaining a natural rubber latex from a guayule bush, the latex having a dry natural rubber content of from about 10 to about 40 percent by weight, adding from about 0.1 to about 25 parts by weight of a surfactant per one hundred parts by weight of dry natural rubber, wherein the surfactant is selected from the group including nonionic, ionic, and amphoteric surfactants, adding from about 1,000 units to about 500,000 units of a lipid reducing enzyme preparation per gram of dry natural rubber, wherein the lipid reducing enzyme preparation is selected from the group including lipases from plant, animal, synthetic and microbial sources, adding a pH buffer to maintain the pH in a range of from about 5 to about 12, wherein the pH buffer is selected from the group including triethanolamine, imidazole, tris (hydroxymethyl)amino methane 1,3-bis[tris (hydroxymethyl)methylamino]propane (bis-tris propane), 3-[(1,-dimethyl-2-hydroxyethyl)amino]-2-hydroxypropanesulfonic acid, 3-(cyclohexylamino)-2-hydroxyl-propanesulfonic acid, glycine, N,N-bis(2-hydroxyethyl)glycine, borate, and the like, mixing the natural rubber latex with the lipid reducing enzyme preparation for a period of between one-half hour to about 24 hours at a temperature of from about 20° C. to about 60° C., separating rubber particles into a concentrated rubber phase from the latex by techniques selected from the group including batchwise centrifugation, continuous centrifugation, and creaming, rinsing the concentrated rubber phase with water until the protein content is less than the protein content in the natural rubber latex.

PREFERRED EMBODIMENT FOR CARRYING OUT THE INVENTION

Figure 1:
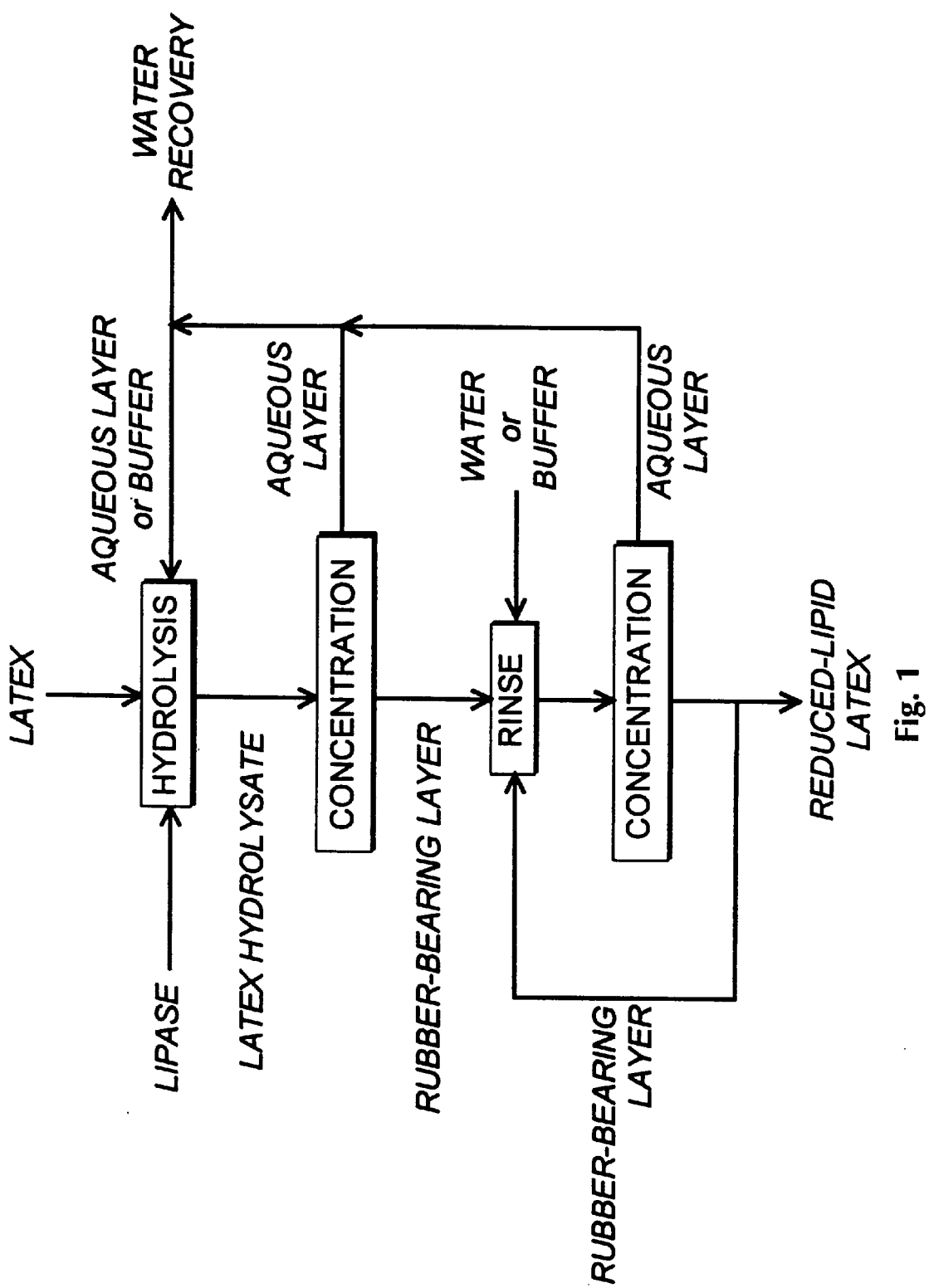
FIG. 1 is a schematic representation of a preferred process according to the present invention for forming a reduced-lipid latex.

As it is understood, natural rubber latex formed within a plant is cytoplasm with dispersed rubber and non-rubber particles. The retrieval of latex from a particular plant source depends on the location within the plant where the latex is formed and stored. For example, the latex in some plants, such as the Brazilian rubber tree, is stored in a specialized system of latex-bearing cells and may be harvested merely by tapping the tree. On the other hand, access to the latex in non-laticiferous plants, such as the guayule bush, is typically achieved by comminution, i.e., grinding or crushing the entire plant. In theses non-laticiferous plants, the latex is typically separated by contacting the comminuted plant tissue with an aqueous medium, filtering the resulting mixture, and separating the rubber containing filtrate phase from the aqueous phase by centrifugation.

In non-laticiferous plants and shrubs, the latex-bearing cells may surround specialized ducts or canals. These ducts are extracellular spaces that contain resin, which is a generic term for mixtures of various water-insoluble, non-rubber lipids. In contrast to the lipids stored in extracellular resin ducts, certain lipids, such as fatty acid triglycerides, may be stored within plant cell cytoplasm like that of the latex, in special organelles called spherosomes.

Among the lipids present in the comminuted tissue of whole guayule plants are compounds including, but not limited to, terpenes, sesquiterpenes, sesquiterpene esters, phytosterols, sterol esters, triterpenoids, and fatty acid triglycerides. These lipids represent a combination of those lipids present in both the native guayule latex before comminution, and those released from resin ducts during comminution. Although the composition of the lipids in comminuted whole guayule is known, the composition of the lipids in native guayule latex is unknown.

It has now been surprisingly found that the lipid content of natural rubber latices that are obtained from plant sources may be significantly reduced by using an enzyme preparation that may be referred to herein as a lipid-reducing enzyme preparation. It is also believed that films prepared from natural rubber latices that have been treated with an enzyme preparation according to the present invention have improved mechanical properties. Accordingly, the present invention is generally directed toward a novel technique for reducing the lipid content of latices, the resulting reduced lipid latex of natural rubber, and dipped formed goods thereof.

In one embodiment, the present invention provides a natural rubber latex having reduced levels of lipids. By reduced levels of extractable lipids, it is meant that the concentration of lipids in a latex after enzyme treatment is less than that in the latex before treatment. It is preferred, however, that the latex of the present invention contain less than about 11 percent extractable lipid on a dry rubber basis. More preferably, the latex of the present invention should contain less than about 9 percent extractable lipids on a dry rubber basis. And, even more preferably the latex of the present invention should contain less than about 7 percent extractable lipids on a dry rubber basis.

Another embodiment of the present invention provides a process for forming a reduced lipid latex. Accordingly to this process, a natural rubber latex is contacted with an enzyme preparation that reduces extractable lipids. Preservatives, as well as surfactants, may optionally be added to the mix to help stabilize and disperse the mix components. The reaction is carried out at a suitable pH level and temperature, for a sufficient amount of time to effect the desired reduction of lipids. The rubber phase is then separated from the aqueous phase using suitable separation techniques. The lipid reducing enzyme preparation, as well as the now aqueous solubilized lipids byproducts, are removed in the aqueous phase. A schematic representation of the process for forming a reduced-lipid latex is shown in FIG. 1.

In practicing the present invention, suitable latices may be obtained from various plant sources. Among the plant materials that can be used as sources of natural rubber latices are the Brazilian (Para) rubber tree (*Hevea brasiliensis*), guayule and its relatives (*Parthenium argentatum, incanum, stramonium* var. *tomentosum*, et al.), it being understood that reference to guayule within this specification will include all relatives thereof, the rubber plant (*Ficus elastica*), rabbitbrush (*Crysothamnus nauseosus*), Madagascar rubber vine (*Cryptostegia grandiflora*), milkweeds (*Asclepias syriaca, speciosa, subulata* et al.) pale Indian plantain (*Cacalia atriplicifolia*), Russian dandelion (*Taraxacum bicorne*), mountain mint (*Pycnanthemum incanum*), American germander (*Teucreum candense*), and tall bellflower (*Campanula americana*). Many other plants that produce cis-1,4-polyisoprene are known, particularly among the Asteraceae, Euphorbiaceae, Campanulaceae, Labiatae, and Moraceae families. It is to be understood that the rubbers from these plants—including guayule—fall under the general classification of natural rubbers and hence can be utilized either alone or in combination with each other in practicing the present invention. It should be further understood that the term natural rubber or simply rubber as used herein refers to that polyisoprene believed to be cis-1,4-polyisoprene, obtained from plant life as discussed above, as well as any naturally occurring derivatives thereof found in plant life.

As described hereinabove, natural rubber latex may be obtained by tapping laticiferous plants, such as *Hevea brasiliensis*, or by comminuting non-laticiferous plants and shrubs, such as the guayule shrub. In the latter situation, further processing may be required, including separating the dilute dispersion by expression or washing, clarifying the dispersion by filtration or centrifugation, and concentrating the rubber-containing phase by centrifugation. It should be appreciated that inasmuch as one advantage of the present invention is to reduce lipid levels within natural latex, and because certain natural rubber latices obtained from comminuted plant life have deleterious lipid levels, the present invention is particularly advantageous when natural rubber is obtained from plants and shrubs, such as the guayule plant.

In accordance with the process for forming a reduced lipid latex, a suitable lipid reducing enzyme preparation is added to a natural rubber latex. Enzyme preparation refers to any of several forms in which the enzyme is available, including, but not limited to, the essentially pore forms, which are typically crystalline, impure solids, and solutions, which are typically aqueous. As used herein, a lipid reducing enzyme preparation is an enzyme preparation that will effect a conversion of lipids to various byproducts. Although, not wishing to be bound to any particular theory, it is believed that the enzyme preparation will hydrolyze triglycerides to fatty acids and glycerols, or will hydrolyze other lipids to various byproducts. A preferred enzyme preparation is any of the triacylglycerol lipases that are identified collectively as EC 3.1.1.3. by the International Union of Biochemistry and Molecular Biology Enzyme Commission. Useful enzyme preparations may be derived from plant, animal, or microbial or synthetic sources. For example, lipid reducing enzyme preparations include those from microbial sources such as *Candida rugosa, C. Jipolytica, C. cylindracea, C. antarctica*, and like species; *Rhizopus arrhizus, R. delamar*, and like species; *Chromobacterium viscosum* and like species; *Mucor javanicus, M. meihei, M. pusillus, M. lipolyticus*, and like species; *Pseudomonas cepacia* and like species. Others can be obtained from animal sources such as human, bovine, or porcine pancreatic lipase. Plant sources include lipase from wheat germ. Synthetic sources include enzyme preparations based on genetically engineered enzymes. Preferred commercial enzyme preparations include Lipase M™(a *Candida rugosa* lipase) produced by the enzyme Development Corporation of Scranton, Pa.; Pancreatic Lipase 250™ produced by Valley Research, Inc., of South Bend, Ind.; and Lipolase™ 100L produced by Novo Nordisk of Franklinton, N.C., and Validase™ Fungal Lipase 8000 produced by Valley Research, Inc., both of which are *Aspergillus oryzae* lipases. Mixtures of the above enzyme preparations can also be employed.

The process for the formation of reduced lipid latex according to the present invention can be carried out by contacting the latex with from about 1,000 units to about 500,000 units of a suitable lipid reducing enzyme preparation per gram of dry rubber content. For purposes of the specification, one unit of lipid reducing enzyme preparation is defined as the amount of enzyme capable of catalyzing the release of 1 $\mu$mol of acid per minute at 30° C. and pH 7.0 using tributyrin as the substrate. The amount of enzyme depends in part on the solids content of the latex, the lipid content of the latex, and the characteristics of the enzyme. A typical enzyme preparation contains about 1,000 to about 250,000 units based on dry rubber content, preferably about 2,000 to about 100,000 units based on dry rubber content, and more preferably about 5,000 to about 100,000 units based on dry rubber content, of at least one lipid reducing enzyme preparation. By contacting it is meant that the latex is brought into intimate contact with the lipid reducing enzyme preparation such that there is physical contact between molecules. A preferred method of contacting is by mixing in solution, suspension, or emulsion.

Prior to the addition of the lipid reducing enzyme-preparation, suitable preservatives, including anticoagulants and antidegradants, may be added to the latex to stabilize the natural rubber contained therein. The skilled artisan will be able to readily determine a useful or advantageous amount of preservatives to be added to the latex. Examples of such preservatives include ammonia; sodium hydroxide; potassium hydroxide; sodium dihydrogen phosphate; disodium hydrogen phosphate; zinc oxide; zinc dialkyldithiocarbamates such as Ethyl Zimate® produced by R. T. Vanderbilt Company of Norwalk, Conn.; tetraalkylylthiuram disulfides such as Thiurad® produced by the Monsanto Company of St. Louis, Miss.; sulfite salts such as sodium sulfite and the like; ascorbic acid and ascorbate salts such as sodium ascorbate, potassium ascorbate, and the like; boric acid and borate salts such as sodium borate and the like; propionic acid and propionate salts such as sodium propionate and the like; benzoic acid and benzoate salts such as sodium benzoate and the like; esters of 4-hydroxybenzoic acid such as methyl paraben, propyl paraben, and the like; and esters of gallic acid such as propyl gallate and the like. Alternatively, aqueous dispersions of antidegradants such as those described in *The Vanderbilt Latex Handbook*, 3rd edition, pp. 80–83, can be added to the latex. Examples of such dispersable antidegradants include hindered phenols such as Wingstay® L produced by the Goodyear Chemical company of Akron, Ohio, AgeRite® Superlite produced by the Vanderbilt Company, and Santowhite® Powder produced by the Monsanto Company; aromatic amines such as Santoflex® 13 produced by the Monsanto Company, Wingstay® 100 produced by the Goodyear Chemical Company, and AgeRite® Stalite produced by R. T. Vanderbilt Company; dihydroquinolines such as AgeRite® Resin D produced by R. T. Vanderbilt company, and Flectol® H produced by the Monsanto Company; and phosphites such as Vanox 13 and AgeRite® Geltrol produced by R. T. Vanderbilt Company.

The components of the resin reducing enzyme preparation are most advantageously dispersed and stabilized by the addition of at least one surfactant. Generally, surfactant is added in an amount from about 0.1 to about 25 percent by weight based on dry rubber content. The amount of surfactant depends in part on the solids content of the latex, the ratio of latex to buffer, the amount of lipid reducing enzyme preparation, and the characteristics of the surfactant. A typical enzyme preparation contains from about 0.1 to about 20 percent by weight based on dry rubber content, preferably from about 0.2 to about 15 percent by weight based on dry rubber content, and more preferably from about 0.2 to about 10 percent by weight based on dry rubber content, of at least one surfactant.

Effective nonionic surfactants include the polyoxypropylene-polyoxyethylene block copolymers such as the Pluronic® and Pluronic R series produced by the BASF Corporation of Parsippany, N.J.; alkylphenol ethoxylates such as the Igepal® CO-series produced by Rhone-Poulenc of Cranbury, N.J. and the Triton® X-series produced by the Union Carbide Corporation of Danbury, Conn.; and alcohol ethoxylates such as the Tergitol® series produced by the Union Carbide Corporation, and the Iconol® series produced by the BASF Corporation.

Effective amphoteric surfactants include 3-[(3-cholamidopropyl)dimethylammonio]-1-propanesulfate and the like, and fatty acid betaines such as the Rewoteric™ series produced by the Witco Corporation of Dublin, Ohio. Effective anionic surfactants include the alkali metal salts of fatty acids such as sodium stearate, sodium palmitate, potassium oleate, and the like; the alkali metal salts of fatty acid sulfates such as sodium lauryl sulfate and the like; the alkali metal salts of alkylbenzene- and alkylnaphthalenesulfonates such as sodium dodecylbenzenesulfonate, sodium alkylnaphthalene-sulfonate, and the like; the alkali metal salts of dialkylsulfosuccinates and the like such as Emcol® 4500 by Witco Chemical Company of New York, N.Y.; the alkali metal salts of sulfated alkylphenol ethoxylates such as sodium octylphenoxypolyethoxyethyl sulfate produced as Triton X-301 by Union Carbide Corporation; the alkali metal salts of polyethoxyalcohol sulfates such as the Alipal CD-series produced by Rhône-Poulenc; and the alkali metal salts of polyethoxyalkylphenol sulfates such as the Alipal CO-series produced by Rhône-Poulenc. Mixtures of the above nonionic, amphoteric, and anionic surfactants can also be employed.

The enzymatic reduction of lipid according to the present invention can be carried out at a suitable pH of from about 5 to about 12, preferably from about 6 to about 12, and more preferably from about 8 to about 1 1, depending on the activity and stability characteristics of the resin reducing enzyme preparation. Any buffer can be used which is effective in maintaining the above pH range. A typical hydrolysis mixture contains about 0.001 to about 0.20 moles of buffer, preferably about 0.002 to about 0.020 moles of buffer, and more preferably about 0.002 to about 0.1 0 moles of buffer per liter of hydrolysis mixture.

Suitable buffers include triethanolamine, imidazole, tris (hydroxymethyl)amino methane (THAM, tris or Trizma® produced by the Sigma Chemical company of St. Louis, Miss.), 1,3-bis[tris(hydroxymethyl)methylamino]propane (bis-tris propane), 3-[(1,1-dimethyl-2-hydroxyethyl) amino]-2-hydroxypropanesulfonic acid (AMPSO), 3-(cyclohexylamino)-2-hydroxyl-propanesulfonic acid (CAPSO), glycine, N,N-bis(2-hydroxyethyl)glycine (bicine), borate, and the like. Where the latex is preserved with from about 0.1% to about 0.7% by weight of ammonia, such as in the low-ammonia Hevea latex concentrates, the use of a buffer may be unnecessary.

The enzymatic reduction of lipid according to the present invention is most preferably carried out at a temperature sufficient to effect a rapid rate of reaction and for a time sufficient to effect a complete hydrolysis of saponifiable resin components. The reaction temperature depends in part on the characteristics of the lipid reducing enzyme preparation used to effect lipid reduction. A typical reaction is carried out at a temperature of from about 20° C. to about 60° C., preferably from about 23° C. to about 50° C., and more preferably from about 25° C. to about 45° C. The reaction time, i.e., the time in which the latex is in contact with an active lipid reducing enzyme preparation, depends in part on the temperature, the characteristics of the lipid reducing enzyme preparation, the rate of agitation, the solids content of the latex, and the lipid content of the latex. A typical reaction is carried out in a suitable time for from about one-half to about 24 hours, preferably from about 1 to about 12 hours, and more preferably from about 2 to about 10 hours.

The latex hydrolysate, i.e., the latex produced by treatment with the lipid reducing enzyme preparation, typically contains between about 10 and about 40 percent solids by weight. In addition to suspended rubber particles, the latex contains the lipid reducing enzyme that retains a substantial amount of its catalytic activity. Accordingly, it is most desirable to separate the suspended rubber particles from the aqueous phase containing the enzyme and concentrate the resulting rubber-bearing phase by centrifugation. Separation may be batchwise or continuous. Suitable batch centrifuge designs include fixed angle rotor systems such as those produced by Beckmann Instruments of Fullerton, Calif., and swinging bucket rotor as those produced by International Equipment Company of Needham Heights, Mass. Suitable continuous flow-through centrifuge designs include those in common use for the production of Hevea latex such as the bowl-disk designs produced by Alfa Laval Separation of Warminster, Pa. The speed and duration of centrifuge operation, as well as the flow rate during continuous separation, are preferably maintained so as to minimize or prevent the formation of firmly coagulated rubber. Alternatively, a stabilizing or creaming agent such as ammonium alginate, produced as Superloid™ by the Kelco Division of Merck & Co. of Rahway, N.J., or methycellulose, produced as Methocel™ 4M by the Dow Chemical Company of Midland, Mich., may be added. The mixture is then allowed to stand for a period of time and separate into two layers, an upper layer containing substantially all of the rubber and a lower layer essentially free of rubber. Separating the rubber phase from the aqueous phase containing the lipid reducing enzyme, therefore, may be carried out by centrifugation, creaming, or suitable combination of centrifugation and creaming. The concentrated rubber phase may be rinsed, i.e., the concentrated rubber phase may itself be diluted with water or a suitable buffer solution, and concentrated in accordance with the above description so as to effect a more complete recovery of the lipid-reducing enzyme. The number of sequential dilutions and concentrations depends in part on the desired final concentration of the lipid-reducing enzyme in the latex product. The total protein content of the latex product produced by treatment with lipase reducing enzyme preparation consists of protein present in the latex before treatment and protein from the lipid reducing enzyme preparation. Preferably, the final total protein concentration in the latex product after rinsing is less than the protein content of the latex before treatment with the enzyme preparation. The enzyme removed from the latex by washing can be re-used in a subsequent latex treatment.

The present invention also provides a process for the formation of the vulcanized rubber films that are described above. According to this process, the reduced lipid latex of the present invention is utilized in conjunction with conventional methods of achieving a vulcanized film. A typical latex compound may include surface active agents for uniform mixing of water-immiscible ingredients, liquid phase modifiers either to prevent premature coagulation during compounding or to provide a controlled rate of gel formation, as well as polymer phase modifiers to impart desired physical properties to the cured compound.

Surface active agents include dispersing and wetting agents for the dispersal of solids such as Darvan® WAQ and Darvan® SMO, as well as emulsifying agents such as Darvan® WAQ for the dispersal of liquids. Products sold under the name Darvan® are commercially available from R. T. Vanderbilt Company. Liquid phase modifiers include stabilizers such as potassium hydroxide and ammonia to control pH and surfactants to maintain colloidal properties; thickeners such as ammonium alginate and methyl cellulose to give desirable flow characteristics; wetting agents such as Surfynol® TG, which is commercially available from Air Products and Chemicals, Inc. of Allentown, Penn., to facilitate film formation and fiber impregnation; coagulants such as calcium nitrate and ethanol to initiate coalescence of polymer particles; gelling agents such as sodium silicofluoride to destabilize latex and form a continuous solid phase; defoamers such as Surfynol® DF-37, also available from Air Products and Chemicals, Inc., to control foaming; and heat sensitizers such as ammonium persulfate and poly(vinyl methyl ether) to permit gelation at elevated temperatures. The polymer phase modifiers include vulcanizing agents such as sulfur to form cross-links between polymer chains; cure activators such as zinc oxide to promote cross-link formation, accelerators such Butyl Namate®, commercially available from R. T. Vanderbilt Company, and Setsit® 104, commercially available from R. T. Vanderbilt Company to control the rate vulcanization; antidegradants such as Wingstay® 100, commercially available from The Goodyear Tire and Rubber Company of Akron, Ohio, Naugawhite®, commercially available from Uniroyal Chemical Company of Naugatuck, Connecticut, and AgeRite® Superlite®, available from R. T. Vanderbilt Company to impart age resistance; fillers such as clays, carbon blacks, and colloidal silicas and talcs to modify tensile, abrasion, and tear properties; dyes and pigments; and softeners such as mineral oil to control modulus.

Once the compounding recipe, as generally described above, has been prepared and allowed to prevulcanize, dipped films can be easily formed as commonly known in the art. These cured or vulcanized dipped film goods prepared from the reduced lipid natural rubber latex of the present invention contain reduced levels of resin triglycerides, and as a result the dipped film goods of the present invention exhibit increased tensile strength and resistance to tear as described hereinabove.

The latices obtained in accordance with this invention are suitable for use in the preparation of foam rubber, coating compositions, emulsion paints, rubber dams, adhesives, binders, and especially dipped goods such as gloves, balloons, condoms, and tubing.

In order to demons

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

EXAMPLE 1

Guayule shrub was passed through a hammermill with a 6.5 mm screen in an aqueous medium (1:5 w/v) containing 0.1 percent by weight sodium sulfite and 1 percent by weight polyvinylpolypyrrolidone, then filtered. Sufficient aqueous ammonia was added to the resulting homogenate to proved an ammonia content of 0.2 percent. Preliminary clarification was obtained with a single pass through a Westphalia Model KA 05-00-105 centrifuge fitted with a chamber-type-bowl. Final purification was carried out using the centrifuge with three cycles of separation, subsequent 5-fold dilution of the light phase with 0.2 percent aqueous ammonia, and respiration. Purified latex (57 L total) was diluted with 0.1 percent w/v ammonium alginate (Kelco Superloid) 1:2.5 by volume in a polyethylene tank. After phase separation was complete, the lower, nonlatex phase was drained from the tank and the latex phase rediluted as before. Two more cycles were carried out using 0.05 percent by weight ammonium alginate. The final product (56 percent dry rubber content) was transferred to polyethylene bottles and stored at 4° C. until use.

EXAMPLE 2

To a reactor were charged 180 parts of the product of Example 1, equivalent to 100 parts of rubber, 21 parts of 0.40 M CAPSO buffer (pH 9.8), 5.2 parts of 2 percent by weight Triton X-1 00, 1.5 parts of AgeRite Stalite emulsion, 42 parts of Lipolase 1 00L, and 84 parts of water. The reactor was then placed in a water bath maintained at about 37° C. and the water-latex mixture stirred with a paddle-type impeller operated at about 46 rpm for 12 hours. Filtration of the resulting hydrolysate mixture through a 60-mesh filter cloth yielded 324 parts of dilute latex. this latex was separated into 170 parts of an upper rubber-bearing layer and 154 parts of a lower aqueous layer containing essentially no rubber by means of centrifugation at about 1200×g for 45 minutes again yielded an upper rubber-bearing layer and a lower aqueous layer containing essentially no rubber. The lower layer, 291 parts, was drawn off to leave 171 parts of hydrolyzed guayule latex having a dry rubber content of 53 percent and equivalent to 90 parts of rubber.

EXAMPLE 3

To a reaction vessel were charged 180 parts of the product of Example 1, equivalent to 100 parts of rubber, 5.2 parts of 2 percent w.w Triton X-1 00, 42 parts of Lipolase 100L, and 106 parts of 0.2 percent by weight aqueous ammonia (pH 11.0). The vessel was then placed in an incubator-shaker maintained at about 37° C. and the water-latex mixture shaken at about 75 rpm for 12 hours. After filtration of the reaction mixture through a 60-mesh filter cloth, 333 parts of dilute latex hydrolysate were recovered. This latex was separated into 142 parts of an upper rubber-bearing layer and 191 parts of a lower aqueous layer containing essentially no rubber by means of centrifugation at about 4900×g for 60 minutes the lower layer was drawn off and replaced by 357 parts of water, the rubber was resuspended by shaking. Centrifugation of the rediluted latex at about 4900×g for 60 minutes again yielded an upper rubber-bearing layer and a lower aqueous layer containing essentially no rubber. The lower layer, 358 parts, was drawn off to leave 142 parts of hydrolyzed guayule latex having a dry rubber content of 67% and equivalent to 95 parts of rubber.

EXAMPLE 4

Following the procedure in Example 3, a mixture consisting of 180 parts of the product of Example 1, equivalent to 100 parts rubber, 42 parts of 0.20 M CAPSO buffer containing 1 percent by weight Triton X-100 (pH 9.9), 42 parts of Lipolase 100L, and 70 parts of water yielded 316 parts of dilute latex hydrolysate. This latex was separated into 150 parts of an upper rubber-bearing layer and 166 parts of a lower aqueous layer containing essentially no rubber by means of centrifugation at about 4900×g for 60 minutes. Subsequent treatment of the rubber-bearing layer in accordance with the procedure in Example 3 yielded 142 parts of hydrolyzed guayule latex having a dry rubber content of 62 percent and equivalent to 89 parts of rubber.

EXAMPLE 5

Following the procedure in Example 3, a mixture consisting of 180 parts of the product of Example 1, equivalent to 100 parts of rubber, and 153 parts of the lower aqueous layer from Example 4 yielded 146 parts of hydrolyzed guayule latex having a dry rubber content of 67 percent and equivalent to 97 parts of rubber.

Examples 2, 4, and 5 set forth procedures for preparing reduced-lipid, natural rubber latices using a buffered lipase composition. Example 3 sets forth a procedure for preparing reduced-lipid, natural rubber latices using lipase without added buffer. Example 5 sets forth a procedure for preparing reduced-lipid, natural rubber latices using lipase recovered from the aqueous phase of the hydrolysate mixture.

The following Table illustrates that the lipid content of the dry rubber polymer in latex isolated from guayule shrub (Example 1), determined as acetone extract in accordance with the procedures set further in ASTM Method D 297-90, is substantially higher than the lipid content of the rubber polymer in hydrolyzed latices prepared in accordance with the procedure set forth in this invention (Examples 2, 3, and 4). Rather unexpectedly, on the basis of previously reported values for the triglyceride contents of latex lipids, treatment of latex in accordance with this invention results in reductions in lipid content of from about 26 percent to about 33 percent.

TABLE I

| Product of Example No. | Lipase treatment | Lipid content, % dry rubber |
| --- | --- | --- |
| 1 | no | 11 |
| 2 | yes | 7.9 |
| 3 | yes | 7.4 |
| 5 | yes | 8.1 |

EXAMPLE 6

Following the procedure in Example 3, a mixture consisting of 188 parts of guayule latex, equivalent to 100 parts of rubber, 5.4 parts of 2 percent by weight Triton X-100, 44 parts of Lipolase 100L, and 104 parts of 0.2 percent of aqueous ammonia yielded 327 parts of dilute latex hydrolysate. This latex was separated into 142 parts of an upper rubber-bearing layer and 191 parts of a lower aqueous layer containing essentially no rubber by means of centrifugation at about 1200×g for 30 minutes. The aqueous layer was drawn off by vacuum aspiration. Sufficient 0.2 percent aqueous ammonia was then added to the rubber bearing layer to adjust the dry rubber content to 20 percent. The rinse process of centrifugation, aspiration, and redilution was repeated three more times.

EXAMPLES 7–8

Proteins in the latex product of Examples 1 and 6 were solubilized in accordance with the procedures set forth in Schloman et al., 69 *Rubber Chemistry and Technology*, p. 215, (1996), which is incorporated herein by reference.

The following Table illustrates that the protein contacted prepared in accolatex prepared in accordance with the procedure set forth in this 8) is substantially (13%) lower than that of latex prepared in accordance with the procedure set forth in Cornish, U.S. Pat. No. 5,580,942, (Example 7).

TABLE II

| Product of Example No. | Lipase treatment | Lipid content, % dry rubber |
|---|---|---|
| 7 | no | 0.873 |
| 8 | yes | 0.756 |

Figure 2:
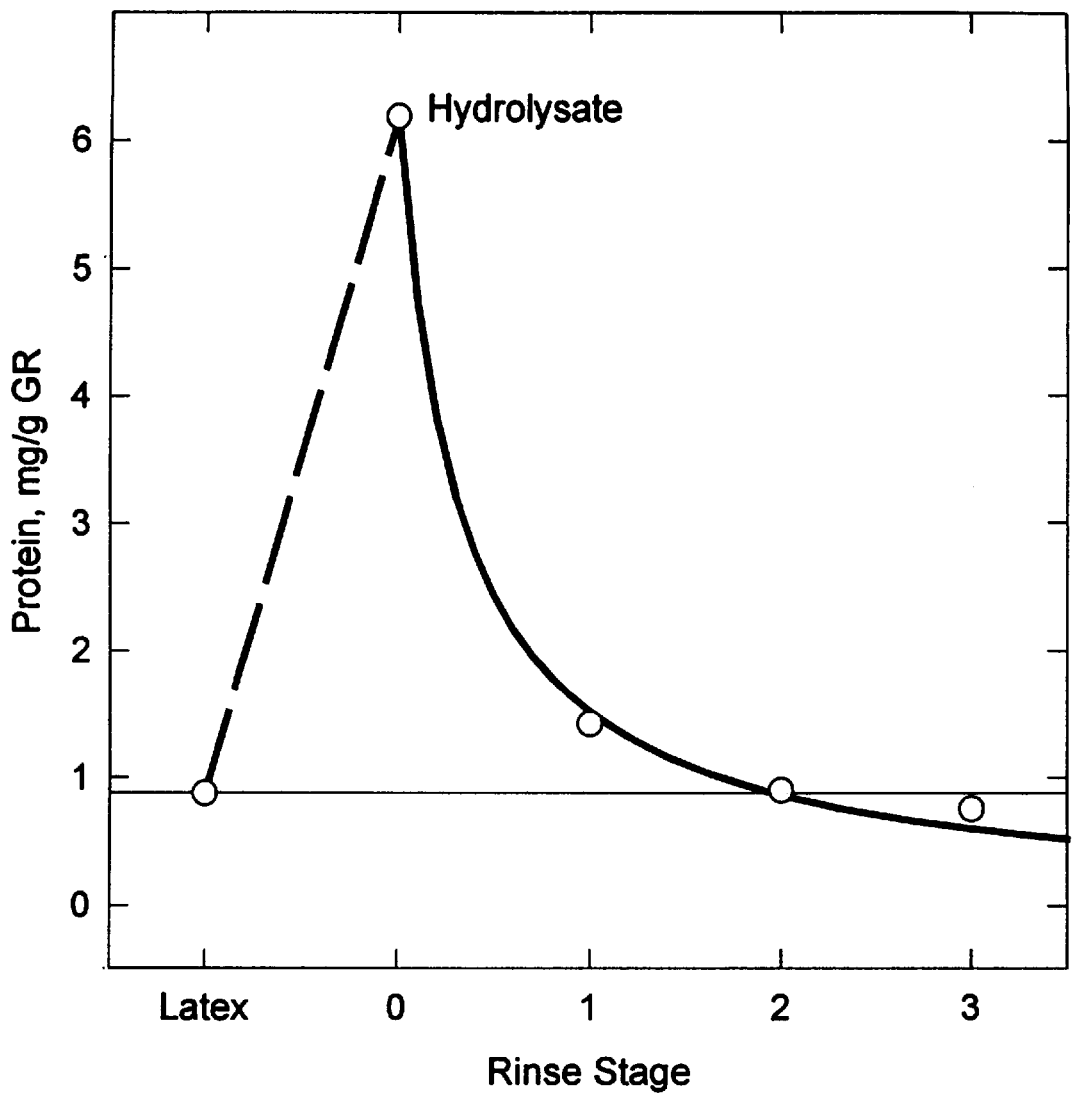
FIG. 2 is a graphical representation of the protein content of a natural rubber latex treated according to the present invention following successive water rinsing.

The sequential decrease in protein content due to rinsing reduced-lipid latex of Example 6 is illustrated in FIG. 2.

Thus it should be evident that the methods of the present invention are highly effective in reducing lipids content in natural rubber latex. The invention is particularly suited for reducing the lipid content of guayule latex, but is not necessarily limited thereto. The methods of the present invention can be used separately with other equipment, methods and the like.

Based upon the foregoing disclosure, it should now be apparent that the use of the processes described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, processes according to the present invention are not necessarily limited to those using triacylglycerol I phase inasmuch as any enzyme that will hydrolyze triglycerides to fatty acids and glycerols can be employed. Thus, the scope of the invention shall include all modifications and variations that may fall within the scope of the attached claims.

What is claimed is:

1. A process for reducing the amount of lipids within natural rubber latices comprising the steps of:
    obtaining a natural rubber latex from a guayule bush, said latex having a dry natural rubber content of from about 10 to about 40 percent by weight;
    adding from about 0.1 to about 25 parts by weight of a surfactant per one hundred parts by weight of dry natural rubber, wherein said surfactant is selected from the group including nonionic, ionic, and amphoteric surfactants;
    adding from about 1,000 units to about 500,000 units of a lipid reducing enzyme preparation per gram of dry natural rubber, wherein said lipid reducing enzyme preparation is selected from the group including lipases from plant, animal, synthetic and microbial sources;
    adding a pH buffer to maintain the pH in a range of from about 5 to about 12, wherein said pH buffer is selected from the group including triethanolamine, imidazole, tris(hydroxymethyl)amino methane 1,3-bis[tris (hydroxymethyl)methylamino]propane (bis-tris propane), 3-[(1,1-dimethyl-2-hydroxyethyl)amino]-2-hydroxypropanesulfonic acid, 3-(cyclohexylamino)-2-hydroxyl-propanesulfonic acid, glycine, N,N-bis(2-hydroxyethyl)glycine, borate, and the like;
    mixing said natural rubber latex with said lipid reducing enzyme preparation for a period of between one-half hour to about 24 hours at a temperature of from about 20° C. to about 60° C.;
    separating rubber particles into a concentrated rubber phase from said latex by techniques selected from the group including batchwise centrifugation, continuous centrifugation, and creaming;
    rinsing the concentrated rubber phase with water until the protein content is less than the protein content in said natural rubber latex.

2. A vulcanized rubber film made using a reduced lipid latex produced using the process of claim 1.

3. A process as set forth in claim 1, further comprising the step of adding a preservative selected from the group including anticoagulants and antidegradants.

4. A process for reducing the amount of lipids within natural rubber latices comprising the steps of:
    obtaining a natural rubber latex;
    mixing the natural rubber latex with a lipid reducing enzyme preparation.

5. A process for reducing the amount of lipids, as set forth in claim 4, wherein the natural rubber latex is obtained form the guayule bush.

6. A process as set forth in claim 4, wherein said latex has a dry natural rubber content of from about 10 to about 40 percent by weight.

7. A process, as set forth in claim 4, further comprising the step of adding from about 0.1 to about 25 parts by weight of said surfactant per one hundred parts by weight of dry natural rubber is added.

8. A process, as set forth in claim 4, further comprising the step of adding a preservative selected from the group including anticoagulants and antidegradants.

9. A process as set forth in claim 4, wherein from about 1,000 units to about 500,000 units of a lipid reducing enzyme preparation per gram of dry natural rubber is added.

10. A process, as set forth in claim 4, wherein said lipid reducing enzyme preparation is selected from the group consisting of lipases from animal, plant, microbial and synthetic sources.

11. A process as set forth in claim 4, wherein a pH buffer is added in an amount sufficient to maintain the pH in a range of from about 5 to about 12.

12. A process as set forth in claim 4, wherein said pH buffer is selected from the group including triethanolamine, imidazole, tris(hydroxymethyl)amino methane 1,3-bis[tris (hydroxymethyl)methylamino]propane (bis-tris propane), 3-[(1,1-dimethyl-2-hydroxyethyl)amino]-2-hydroxypropanesulfonic acid, 3-(cyclohexylamino)-2-hydroxyl-propanesulfonic acid, glycine, N,N-bis(2-hydroxyethyl)glycine (bicine), borate, and the like.

13. A process as set forth in claim 4, further comprising the step of separating said latex into a concentrated rubber phase.

14. A process, as set forth in claim 4, further comprising the step of removing the lipid reducing enzyme preparation from the natural rubber latex.

15. A process, as set forth in claim 4, wherein said step of removing comprises aqueous rinsing of the rubber latex.

16. A process as set forth in claim 4, wherein the protein content of said rinsed latex is less than the protein content of said natural rubber latex.

17. A latex prepared by:

obtaining a natural rubber latex;

mixing the natural rubber latex with a lipid reducing enzyme preparation.

18. A latex, as set forth in claim 17, wherein the natural rubber latex is obtained form the guayule bush.

19. A latex, as set forth in claim 17, where the lipid reducing enzyme preparation comprises triacylglycerol lipase.

* * * * *